(12) United States Patent
Okamura et al.

(10) Patent No.: US 11,396,333 B2
(45) Date of Patent: Jul. 26, 2022

(54) BODY OF VEHICLE

(71) Applicants: TOYOTA JIDOSHA KABUSHIKI KAISHA, Aichi (JP); SUBARU CORPORATION, Tokyo (JP)

(72) Inventors: Junya Okamura, Tokyo-to (JP); Ryo Kimura, Tokyo-to (JP)

(73) Assignees: TOYOTA JIDOSHA KABUSHIKI KAISHA, Aichi-Ken (JP); SUBARU CORPORATION, Tokyo (JP)

( * ) Notice: Subject to any disclaimer, the term of this patent is extended or adjusted under 35 U.S.C. 154(b) by 125 days.

(21) Appl. No.: 17/031,912

(22) Filed: Sep. 25, 2020

(65) Prior Publication Data

US 2021/0094623 A1 Apr. 1, 2021

(30) Foreign Application Priority Data

Sep. 26, 2019 (JP) .............................. JP2019-176105

(51) Int. Cl.
*B60J 7/00* (2006.01)
*B62D 25/20* (2006.01)

(52) U.S. Cl.
CPC ................ *B62D 25/2027* (2013.01)

(58) Field of Classification Search
CPC .. B62D 25/20; B62D 25/2036; B62D 25/025; B62D 25/2027; B60K 1/04; B60K 2001/0438
See application file for complete search history.

(56) References Cited

U.S. PATENT DOCUMENTS

| | | | |
|---|---|---|---|
| 2017/0113728 A1* | 4/2017 | Garay Serrano | B62D 21/02 |
| 2019/0061830 A1 | 2/2019 | Fujisawa et al. | |
| 2019/0233015 A1* | 8/2019 | Kasai | B62D 21/08 |
| 2021/0016831 A1* | 1/2021 | Sasaoka | B62D 21/03 |
| 2021/0094625 A1* | 4/2021 | Okamura | B60K 1/04 |
| 2021/0094626 A1* | 4/2021 | Kimura | B60K 1/04 |
| 2021/0221239 A1* | 7/2021 | Kawase | B60L 50/66 |
| 2021/0237550 A1* | 8/2021 | Kawase | B60K 1/04 |
| 2021/0237805 A1* | 8/2021 | Kawase | B60H 1/00564 |
| 2021/0237806 A1* | 8/2021 | Kawase | B62D 25/025 |

FOREIGN PATENT DOCUMENTS

| | | |
|---|---|---|
| JP | 2014226958 A | 12/2014 |
| JP | 201938482 A | 3/2019 |

* cited by examiner

*Primary Examiner* — Kiran B Patel
(74) *Attorney, Agent, or Firm* — Hauptman Ham, LLP (57) ABSTRACT

A body of a vehicle may include: a floor panel including a panel consisting of a single plate; a pair of rockers extending along both of side edges of the floor panel, respectively; an indoor floor crossmember protruding upward from the floor panel and connecting the rockers to each other; an outdoor floor crossmember protruding downward from the floor panel, connecting the rockers to each other, and located rearward of the indoor floor crossmember; and a unit component located below the floor panel. The unit component may extend from a position located frontward of the indoor floor crossmember to a position that is located rearward of the indoor floor crossmember and frontward of the outdoor floor crossmember. A portion of the floor panel that is within a range surrounded by the pair of rockers, the indoor crossmember, and the outdoor crossmember may consist of the panel.

4 Claims, 8 Drawing Sheets

BODY OF VEHICLE

CROSS-REFERENCE

This application claims priority to Japanese Patent Application No. 2019-176105 filed on Sep. 26, 2019, the contents of which are hereby incorporated by reference into the present application.

TECHNICAL FIELD

The technique disclosed herein relates to a body of a vehicle. It should be noted that in the present disclosure, the vehicle includes gasoline vehicles, electric vehicles, hybrid vehicles, fuel cell vehicles, etc.

BACKGROUND

Japanese Patent Application Publication No. 2019-038482 describes a body of a vehicle. This body includes a floor panel (a front floor panel and a rear floor panel) constituting a cabin floor and a rear crossmember protruding downward from the floor panel. A battery case is disposed below the floor panel. The battery case houses a battery configured to supply electric power to a traction motor. The battery case is located frontward of the rear crossmember.

SUMMARY

In the body of Japanese Patent Application Publication No. 2019-038482, a boundary (joint site) between the front floor panel and the rear floor panel is located frontward of the rear crossmember. The battery case is located frontward of the boundary. The body further includes an underfloor plate that connects a bottom surface of the battery case and a bottom surface of the rear floor panel. This underfloor plate is considered to prevent water from entering the vehicle from the boundary. However, there is room for improvement as a water blocking structure.

A body of a vehicle disclosed herein may comprise a floor panel, a pair of rockers, an indoor floor crossmember, an outdoor floor crossmember, and a unit component. The floor panel may comprise a panel consisting of a single plate. The pair of rockers may extend along both of side edges of the floor panel, respectively. The indoor floor crossmember may protrude upward from the floor panel and connect the rockers to each other. The outdoor floor crossmember may protrude downward from the floor panel, connect the rockers to each other, and be located rearward of the indoor floor crossmember. The unit component may be located below the floor panel. The unit component may extend from a position located frontward of the indoor floor crossmember to a position that is located rearward of the indoor floor crossmember and frontward of the outdoor floor crossmember. A portion of the floor panel that is within a range surrounded by the pair of rockers, the indoor crossmember, and the outdoor crossmember may consist of the panel.

It should be noted that the panel consisting of a single panel means that the panel is not a member in which two or more panels are joined together. Further, the unit component means a component of any type mounted on the vehicle. For example, the unit component may be a component that stores an energy source for the vehicle to run, such as a battery, a fuel tank, a hydrogen tank, etc.

In this vehicle body, the unit component extends from a position located frontward of the indoor floor crossmember to a position that is located rearward of the indoor floor crossmember and frontward of the outdoor floor crossmember. That is, a rear end of the unit component is located rearward of the indoor floor crossmember and frontward of the outdoor floor crossmember. Thus, the unit component does not cover at least a part of a range that is located rearward of the indoor floor crossmember and frontward of the outdoor floor crossmember. In the vehicle body, however, the portion of the floor panel that is within the range surrounded by the pair of rockers, the indoor crossmember, and the outdoor crossmember consists of the panel (i.e., the single plate). That is, the plate does not have any boundaries within the range. Thus, the vehicle body can effectively suppress water from entering the vehicle within the range.

The body of the vehicle disclosed herein does not intend to deny the structure described in Japanese Patent Application Publication No. 2019-038482 (i.e., underfloor plate). Such an underfloor plate may be added to the body structure disclosed herein to further improve the water blocking effect. Such an underfloor plate may not be provided in the body structure disclosed herein to reduce the weight of the body.

In the body structure disclosed herein, the panel consisting of the single plate may be provided with at least one through hole. The panel can be provided with through hole(s) for various purposes, and if the panel is provided with through hole(s), a water blocking structure can be provided to each through hole individually. Even with the panel provided with through hole(s), the water blocking effect can be brought about by the absence of boundaries (boundaries between plates) in the panel.

DETAILED DESCRIPTION

Figure 1:
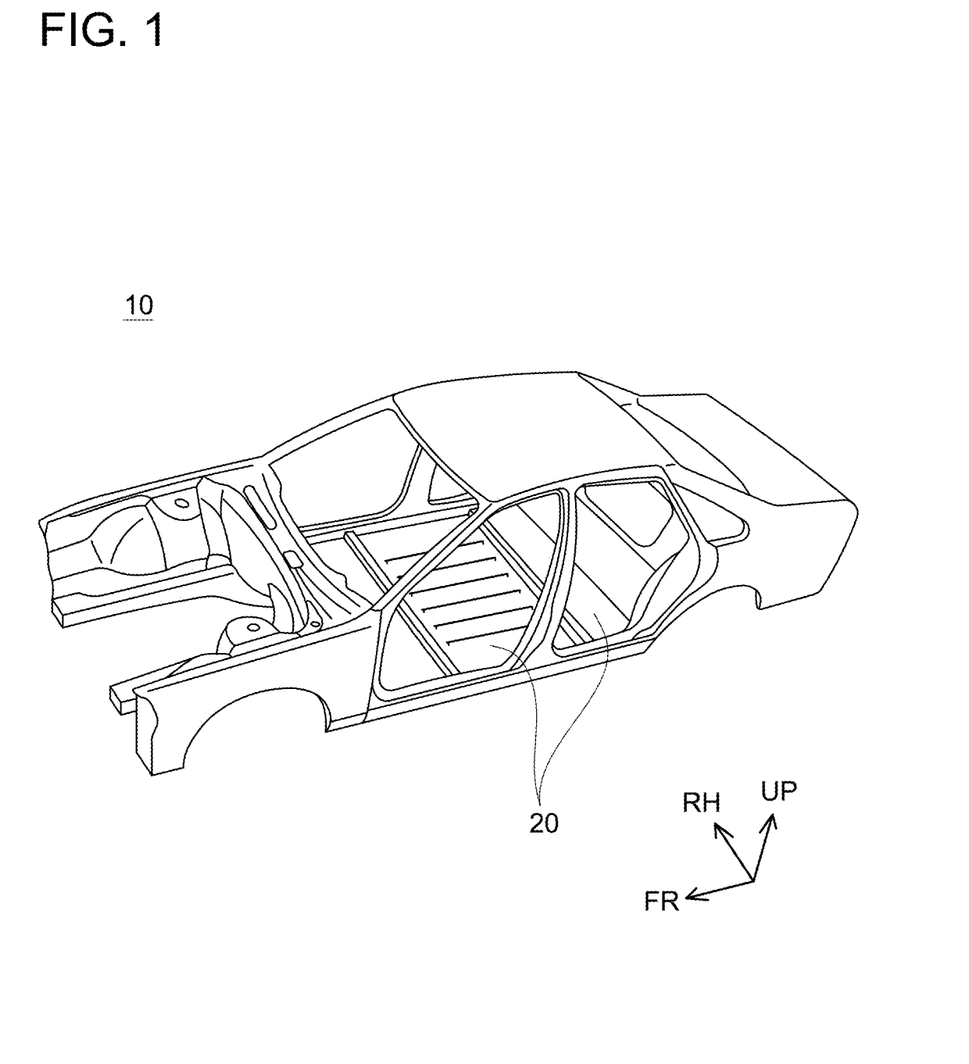
FIG. 1 is a perspective view of a body 10 of a vehicle.

A traction motor is mounted on a vehicle of an embodiment. The vehicle travels by having the traction motor driving its wheels. FIG. 1 shows a body 10 of the vehicle of the embodiment. The body 10 includes a floor panel 20. The embodiment to be described hereinbelow relates to a rear portion of the floor panel 20 and a surrounding structure around the rear portion. In the drawings including FIG. 1, an arrow FR indicates a front direction of the vehicle, an arrow RH indicates a right direction of the vehicle, and an arrow UP indicates an up direction of the vehicle.

Figure 2:
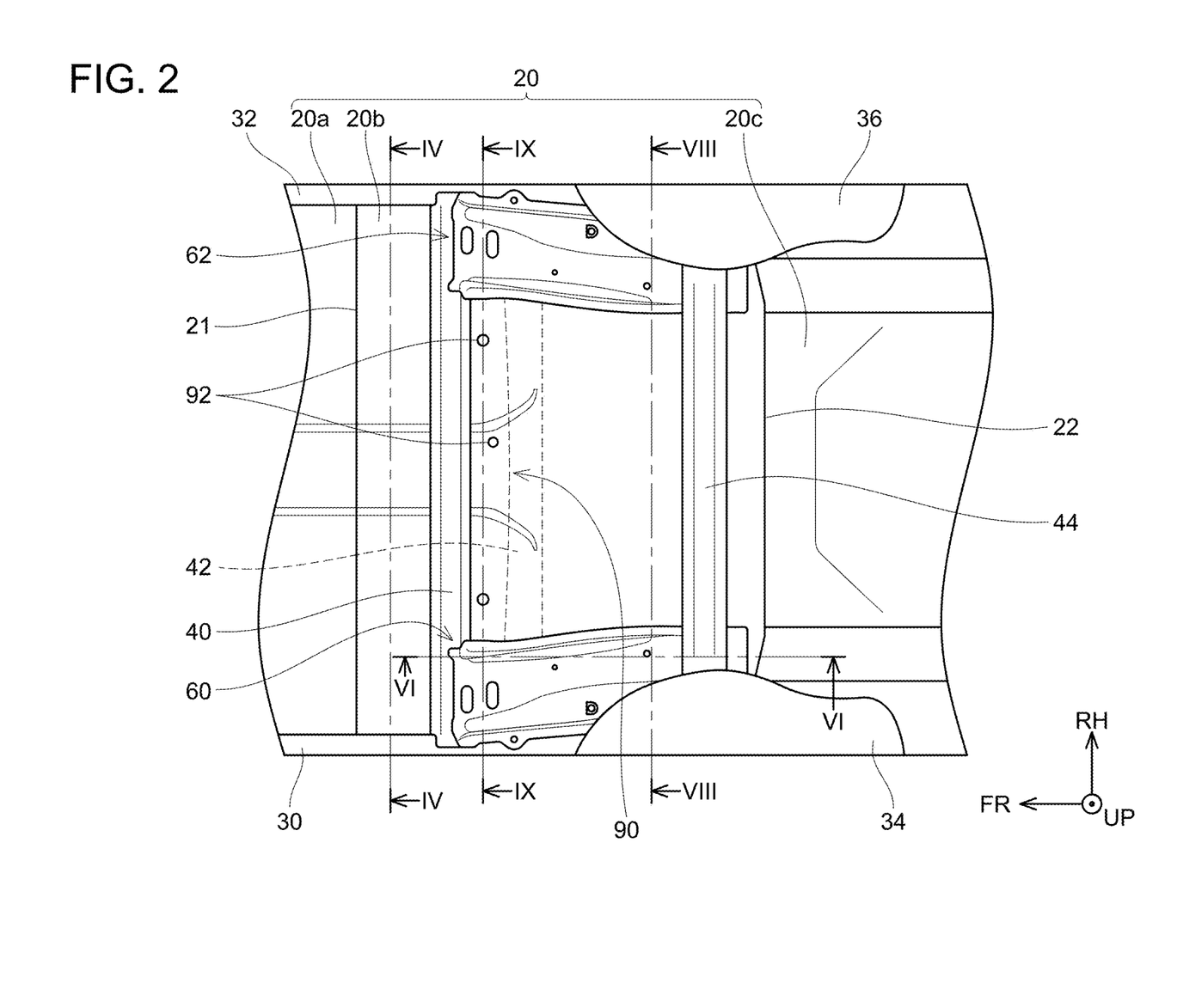
FIG. 2 is a planar view of an underbody from above.
Figure 3:
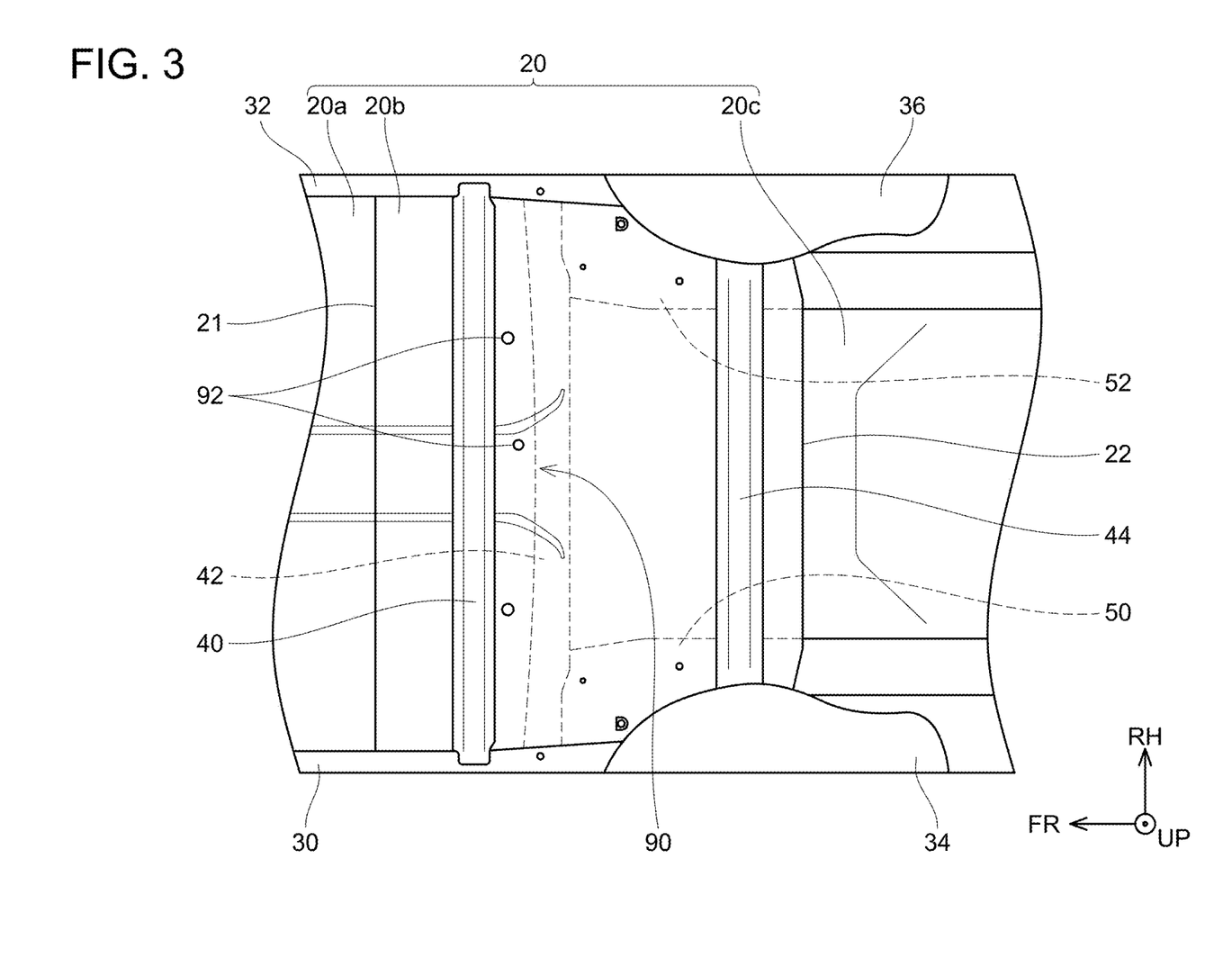
FIG. 3 is a planar view corresponding to FIG. 2, with reinforcements 60, 62 omitted.

FIGS. 2 and 3 each show a planar view of an underbody of the body 10 from above. The planar view of FIG. 2 includes reinforcements 60, 62 disposed on the floor panel 20, while the reinforcements 60, 62 are removed in the planar view of FIG. 3.

As shown in FIGS. 2 and 3, the floor panel 20 includes a front floor panel 20a, a rear floor panel 20b, and a luggage floor panel 20c. From the front to rear of the vehicle, the front floor panel 20a, the rear floor panel 20b, and the luggage floor panel 20c are arranged in this order. Each of the front floor panel 20a, the rear floor panel 20b, and the luggage floor panel 20c consists of a single steel plate (a single plate). A front edge 21 of the rear floor panel 20b is welded to the front floor panel 20a. A rear edge 22 of the rear floor panel 20b is welded to the luggage floor panel 20c. That is, the rear floor panel 20b constitutes a portion of the floor panel 20 between the front edge 21 to the rear edge 22. The front floor panel 20a and the rear floor panel 20b constitute a cabin floor. The luggage floor panel 20c constitutes a luggage space floor.

Figure 4:
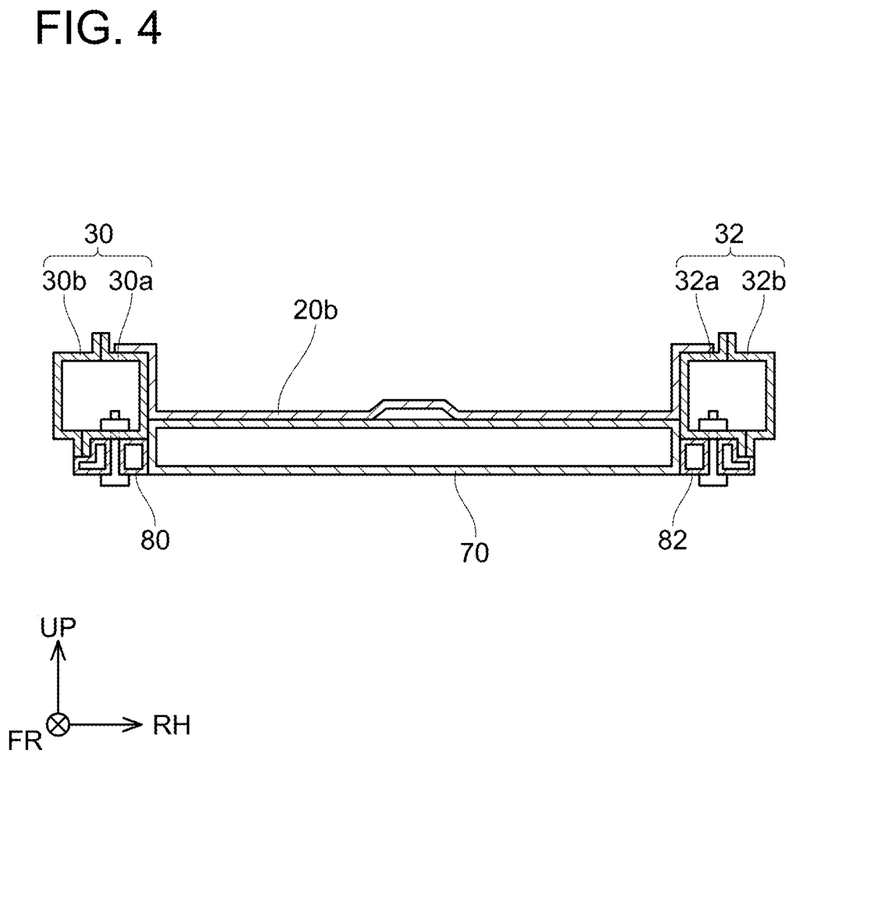
FIG. 4 is a cross-sectional view of the underbody along a line IV-IV in FIG. 2.

As shown in FIGS. 2 and 3, a pair of rockers (a left rocker 30 and a right rocker 32) is disposed at both of side edges of the floor panel 20, respectively. FIG. 4 shows a cross-sectional view of the underbody cut at a position including the left rocker 30 and the right rocker 32 (at a position of line IV-IV in FIG. 2). As shown in FIG. 4, the left rocker 30 includes an inner rocker 30a and an outer rocker 30b. Each of the inner rocker 30a and the outer rocker 30b is an elongated member having a U-shaped cross section, and extends long in a front-rear direction. The inner rocker 30a and the outer rocker 30b are assembled and welded to each other such that they form an inner space. Thus, the left rocker 30 has a hollow prism shape and extends long in the front-rear direction. As shown in FIGS. 2 and 3, the left rocker 30 is arranged along the left edge of the floor panel 20. The left rocker 30 is joined to the front floor panel 20a and the rear floor panel 20b, for example, by welding. As shown in FIG. 4, the right rocker 32 includes an inner rocker 32a and an outer rocker 32b joined to each other, similar to the left rocker 30. The right rocker 32 has a hollow prism shape and extends long in the front-rear direction. As shown in FIGS. 2 and 3, the right rocker 32 is arranged along the right edge of the floor panel 20. The right rocker 32 is joined to the front floor panel 20a and the rear floor panel 20b, for example, by welding.

As shown in FIGS. 2 and 3, a pair of wheel house panels (a left wheel house panel 34 and a right wheel house panel 36) is disposed at both of the side edges of the floor panel 20, respectively. The left wheel house panel 34 is fixed to the left edge of the floor panel 20 at a position rearward of the left rocker 30. The left wheel house panel 34 is a concavely curved plate and is fixed to the floor panel 20 with the concave portion facing outward and downward. The concave portion of the left wheel house panel 34 houses a left rear tire, for example. The left wheel house panel 34 is joined to the rear floor panel 20b and the like, for example, by welding. The right wheel house panel 36 is fixed to the right edge of the floor panel 20 at a position rearward of the right rocker 32. The right wheel house panel 36 is a concavely curved plate and is fixed to the floor panel 20 with the concave portion facing outward and downward. The concave portion of the right wheel house panel 36 houses a right rear tire, for example. The right wheel house panel 36 is joined to the rear floor panel 20b and the like, for example, by welding.

As shown in FIGS. 2 and 3, an indoor floor crossmember 40 and a rear floor crossmember 44 are disposed on an upper surface of the rear floor panel 20b.

Figure 5:
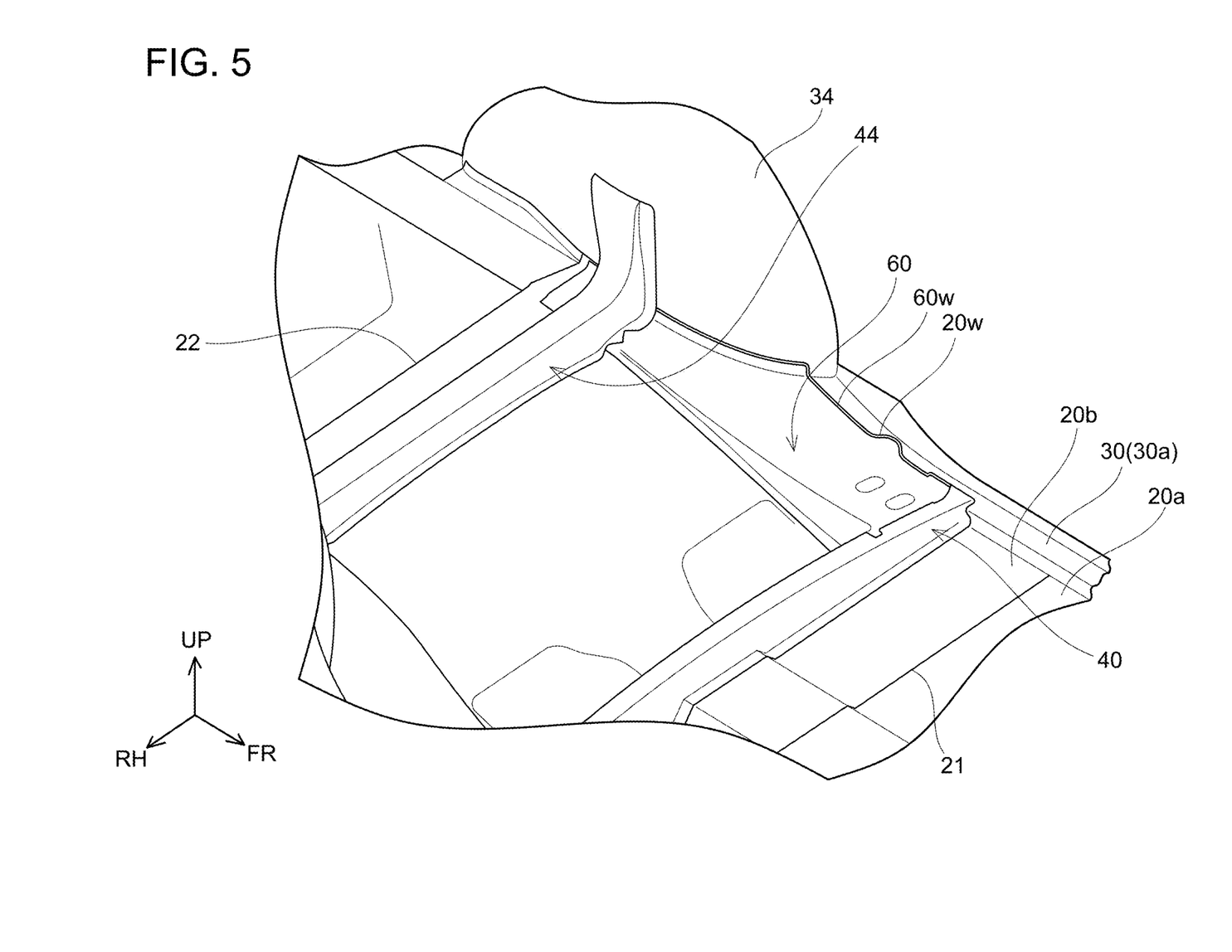
FIG. 5 is a perspective view of an area around a left reinforcement 60 from obliquely above.
Figure 6:
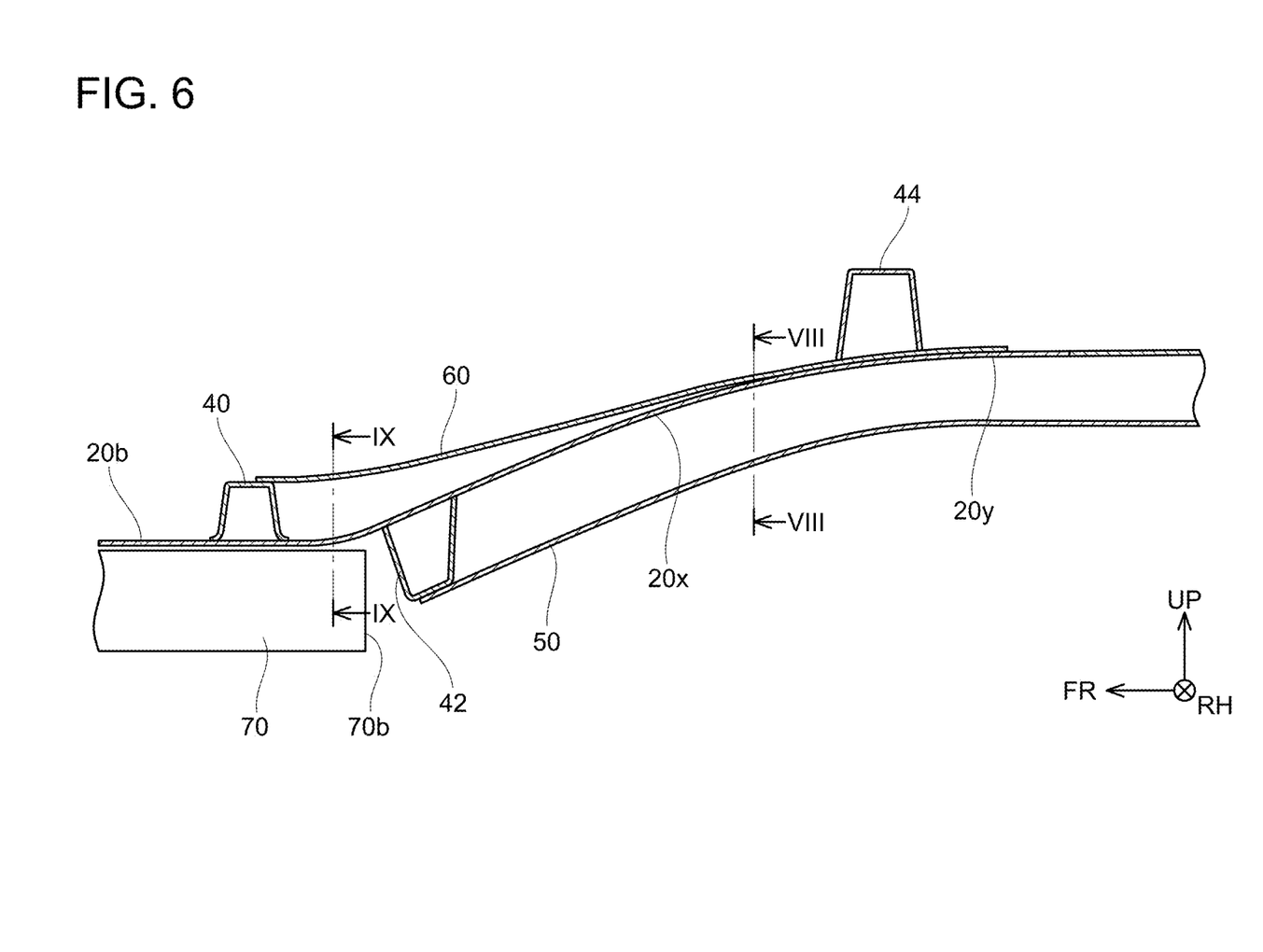
FIG. 6 is a cross-sectional view of the underbody along a line VI-VI in FIG. 2.

FIG. 5 is a perspective view of an area including the indoor floor crossmember 40 and the rear floor crossmember 44 from a right-front side. FIG. 6 is a cross-sectional view of the underbody along a line VI-VI in FIG. 2. As shown in FIGS. 5 and 6, the indoor floor crossmember 40 is a member having a beam shape and a U-shaped cross section. The indoor floor crossmember 40 is disposed to protrude upward from the rear floor panel 20b. The indoor floor crossmember 40 extends long in a right-left direction. As shown in FIGS. 2 and 3, the indoor floor crossmember 40 extends from the left rocker 30 to the right rocker 32. The indoor floor crossmember 40 is joined to the rear floor panel 20b, the left rocker 30, and the right rocker 32, for example, by welding.

As shown in FIGS. 5 and 6, the rear floor crossmember 44 is a member having a beam shape and a U-shaped cross section. The rear floor crossmember 44 is disposed to protrude upward from the rear floor panel 20b. The rear floor crossmember 44 extends long in the right-left direction. The rear floor crossmember 44 is located rearward of the indoor floor crossmember 40. As shown in FIGS. 2 and 3, the rear floor crossmember 44 extends from the left wheel house panel 34 to the right wheel house panel 36. The rear floor crossmember 44 is joined to the rear floor panel 20b, the left wheel house panel 34, and the right wheel house panel 36, for example, by welding.

Figure 7:
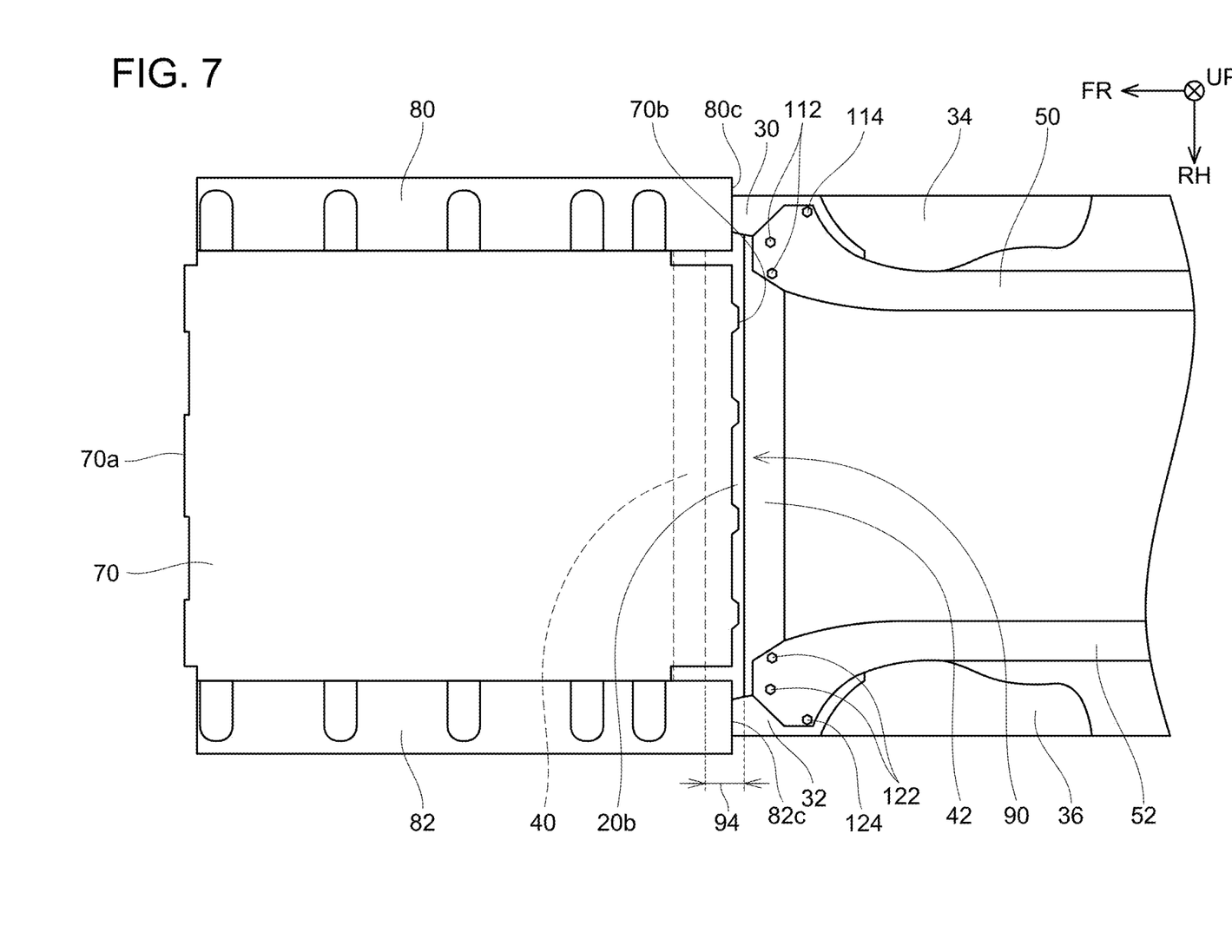
FIG. 7 is a planar view of the underbody from below.

As shown in FIGS. 6 and 7, an outdoor floor crossmember 42 is disposed on a lower surface of the rear floor panel 20b. The outdoor floor crossmember 42 is a member having a beam shape and a U-shaped cross section. The outdoor floor crossmember 42 is disposed to protrude downward from the rear floor panel 20b. The outdoor floor crossmember 42 extends long in the right-left direction. The outdoor floor crossmember 42 is located rearward of the indoor floor crossmember 40. The outdoor floor crossmember 42 is located frontward of the rear floor crossmember 44. The outdoor floor crossmember 42 extends from the left rocker 30 to the right rocker 32. The outdoor floor crossmember 42 is joined to the rear floor panel 20b, the left rocker 30, and the right rocker 32, for example, by welding, bolts, and/or the like.

As shown in FIG. 3, in the planar view of the underbody from above, a portion of the floor panel 20 that is within a range 90 surrounded by the indoor floor crossmember 40, the outdoor floor crossmember 42, the left rocker 30, and the right rocker 32 consists of the rear floor panel 20b (i.e., a single panel). In other words, there are no joint sites of panels (e.g., a joint site (the front edge 21) between the front floor panel 20a and the rear floor panel 20b, a joint site (the rear edge 22) between the rear floor panel 20b and the luggage floor panel 20c) within the range 90. Further, the portion of the rear floor panel 20b within the range 90 is provided with a plurality of through holes 92. Although not shown, members such as various types of hoses, wires, and caps are disposed at the through holes 92. Although not shown, a water blocking treatment is applied to each of the through holes 92.

The rear floor panel 20b extends to a position frontward of the indoor floor crossmember 40 and also extends to a position rearward of the outdoor floor crossmember 42 and the rear floor crossmember 44. As shown in FIG. 6, a portion of the rear floor panel 20b that is located frontward of the indoor floor crossmember 40 extends horizontally. A portion of the rear floor panel 20b that is within a range located rearward of the indoor floor crossmember 40 and frontward of the rear floor crossmember 44 (especially, a range rearward of the outdoor floor crossmember 42) is inclined so as to shift upward toward a rear end of the vehicle. A portion of the rear floor panel 20b that is located rearward of the rear floor crossmember 44 extends horizontally. Hereinbelow, the portion of the rear floor panel 20b that is inclined so as to shift upward toward the rear end of the vehicle will be termed an inclined portion 20x, and the portion of the rear floor panel 20b that is located rearward of the inclined portion 20x and extends horizontally will be termed a horizontal portion 20y.

As shown in FIG. 7, a battery case 70 is disposed below the floor panel 20. The battery case 70 is a sealed container and houses a main battery. The main battery is configured to supply electric power to the traction motor. A pair of EA (Energy Absorption) members (a left EA member 80 and a right EA member 82) is disposed on left and right sides of the battery case 70, respectively. As shown in FIG. 4, the battery case 70 is fixed to the left rocker 30 and the right rocker 32 via the left EA member 80 and the right EA member 82, respectively.

As shown in FIG. 7, a front edge 70a of the battery case 70 is located near a front end of a cabin. As shown in FIGS. 6 and 7, a rear edge 70b of the battery case 70 is located at a position that is rearward of the indoor floor crossmember 40 and frontward of the outdoor floor crossmember 42. That is, in a planar view of the underbody from below, the rear edge 70b of the battery case 70 is located within the range 90. In other words, the battery case 70 extends from a position frontward of the indoor floor crossmember 40 to a position that is rearward of the indoor floor cross ember 40 and frontward of the outdoor floor crossmember 42.

Figure 8:
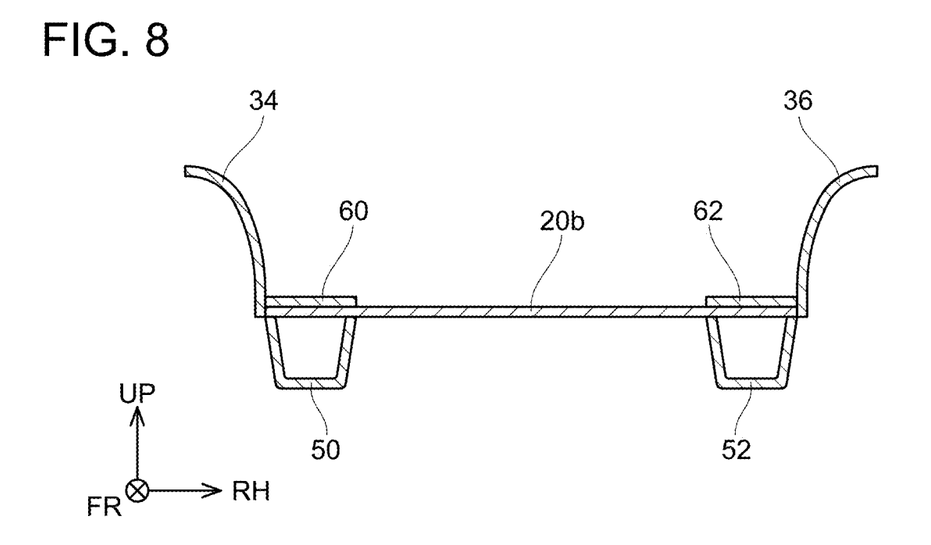
FIG. 8 is a cross-sectional view of the underbody along a line VIII-VIII in FIG. 2.

FIG. 8 shows a cross-sectional view of the underbody along a line VIII-VIII in FIGS. 2 and 6. As shown in FIG. 8, a pair of rear side members (a left rear side member 50 and a right rear side member 52) is disposed on the lower surface of the rear floor panel 20b. As shown in FIG. 8, the left rear side member 50 is an elongated member having a U-shaped cross section. The left rear side member 50 is disposed to protrude downward from the rear floor panel 20b. The left rear side member 50 extends long in the front-rear direction. As shown in FIGS. 6 and 7, the left rear side member 50 partially covers a lower surface of the outdoor floor crossmember 42 at a portion near a front end of the left rear side member 50. As shown in FIG. 7, the left rear side member 50 is joined to the outdoor floor crossmember 42 by welding and a bolt 112. The left rear side member 50 partially covers a lower surface of the left rocker 30 at a portion near the front end of the left rear side member 50. The left rear side member 50 is joined to the left rocker 30 by welding and a bolt 114. As shown in FIGS. 3, 6, and 7, the left rear side member 50 extends rearward from the outdoor floor crossmember 42 along the left edge of the rear floor panel 20b. As shown in FIG. 6, below the inclined portion 20x of the rear floor panel 20b, the left rear side member 50 is inclined to shift upward toward the rear end of the vehicle along the inclined portion 20x. Although not shown, the left rear side member 50 extends up to a rearmost part of the vehicle and is connected to a rear bumper reinforcement at the rearmost part. As shown in FIG. 8, the right rear side member 52 is an elongated member having a U-shaped cross section. The right rear side member 52 is disposed to protrude downward from the rear floor panel 20b. The right rear side member 52 extends long in the front-rear direction. As shown in FIG. 7, the right rear side member 52 partially covers the lower surface of the outdoor floor crossmember 42 at a portion near a front end of the right rear side member 52. The right rear side member 52 is joined to the outdoor floor crossmember 42 by welding and a bolt 122. The right rear side member 52 partially covers a lower surface of the right rocker 32 at a portion near the front end of the right rear side member 52. The right rear side member 52 is joined to the right rocker 32 by welding and a bolt 124. As shown in FIGS. 3 and 7, the right rear side member 52 extends rearward from the outdoor floor crossmember 42 along the right edge of the rear floor panel 20b. Below the inclined portion 20x of the rear floor panel 20b, the right rear side member 52 is inclined to shift upward toward the rear end of the vehicle along the inclined portion 20x. Although not shown, the right rear side member 52 extends up to the rearmost part of the vehicle and is connected to the rear bumper reinforcement at the rearmost part of the vehicle.

As shown in FIG. 2, a pair of reinforcements (a left reinforcement 60 and a right reinforcement 62) is disposed above/on the rear floor panel 20b. The left reinforcement 60 is joined to the indoor floor crossmember 40, the rear floor panel 20b, the left rocker 30, and the left wheel house panel 34. The right reinforcement 62 is joined to the indoor floor crossmember 40, the rear floor panel 20b, the right rocker 32, and the right wheel house panel 36. The structure of the right reinforcement 62 is symmetric to that of the left reinforcement 60. Thus, detailed description for the structure of the right reinforcement 62 is omitted, and the structure of the left reinforcement 60 will be described in detail hereinbelow.

Figure 9:
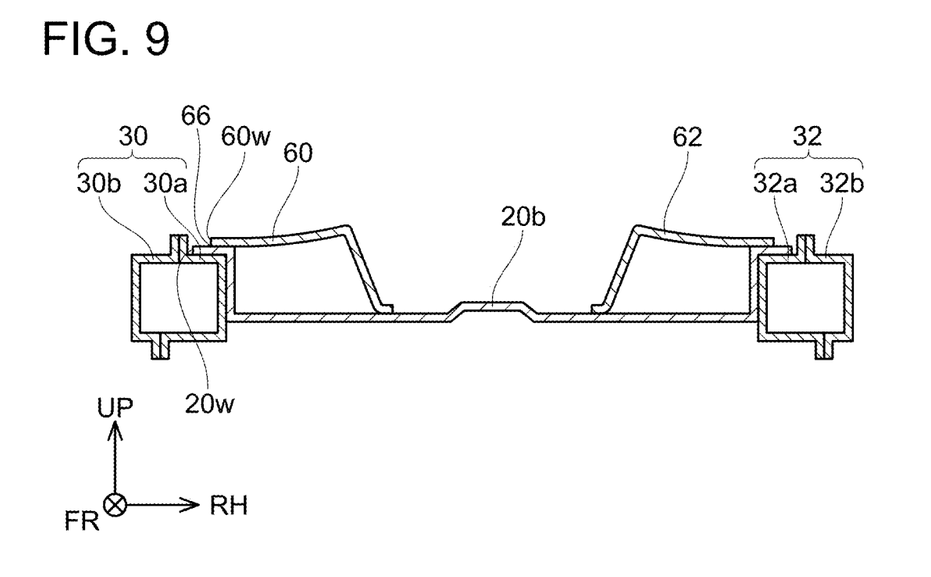
FIG. 9 is a cross-sectional view of the underbody along a line IX-IX in FIG. 2 (with a battery case 70 omitted).

FIG. 9 shows a cross-sectional view of a part of the underbody that includes the left reinforcement 60 (cut at a position of line IX-IX in FIG. 2). As shown in FIG. 9, the left reinforcement 60 is a cover-shaped member. The left reinforcement 60 is disposed to protrude upward from the rear floor panel 20b. As shown in FIG. 5, a front end of the left reinforcement 60 partially covers an upper surface of the indoor floor crossmember 40. The front end of the left reinforcement 60 is joined to the indoor floor crossmember 40, for example, by welding. The left reinforcement 60 extends rearward from the indoor floor crossmember 40 along the left edge of the rear floor panel 20b. Together with the rear floor panel 20b, the left reinforcement 60 is joined to the left rocker 30 and the left wheel house panel 34, for example, by welding. As shown in FIG. 6, a top plate of the left reinforcement 60 is inclined to shift upward toward the rear end of the vehicle along the inclined portion 20x of the rear floor panel 20b. The inclination angle of the top plate of the left reinforcement 60 is smaller than the inclination angle of the inclined portion 20x. Thus, in the vicinity of a rear end of the left reinforcement 60, the top plate of the left reinforcement 60 is in surface contact with the rear floor panel 20b. As shown in FIGS. 2 and 3, in the planar view of the rear floor panel 20b from above, the left reinforcement 60 is located to overlap the left rear side member 50. That is, the left reinforcement 60 is located above the left rear side member 50. The left reinforcement 60 is joined to the rear floor panel 20b at a position above the left rear side member 50, for example, by welding. The rear end of the left reinforcement 60 is located rearward of the rear floor crossmember 44. The rear end of the left reinforcement 60 is located on the horizontal portion 20y of the rear floor panel 20b. At a position where the rear floor crossmember 44 overlaps the left reinforcement 60, the rear floor crossmember 44 covers the left reinforcement 60 from above.

In FIG. 5, reference sign 20w indicates an outer perimeter edge of the rear floor panel 20b, and reference sign 60w indicates an outer perimeter edge of the left reinforcement 60. As shown in FIG. 5, in the range where the left reinforcement 60 overlaps the rear floor panel 20b, the rear floor panel 20b extends outward beyond the outer perimeter edge 60w of the left reinforcement 60. Thus, as shown in FIG. 9, a boundary 66 between the rear floor panel 20b and the left reinforcement 60 is oriented upward (to inside of the cabin).

Next, functions of the above-described body 10 will be described.

As described, in the body 10 of the embodiment, the outdoor floor crossmember 42 is located rearward of the indoor floor crossmember 40. Further, the battery case 70 extends from a position located frontward of the indoor floor crossmember 40 to a position that is located rearward of the indoor floor crossmember 40 and frontward of the outdoor floor crossmember 42 (i.e., to a position within a range 94). Disposing the outdoor floor crossmember 42 rearward of the indoor floor crossmember 40 allows the battery case 70 to extend into the range 94, which results an increase in size of the battery case 70. This enables an increased capacity of the main battery housed in the battery case 70.

Further, in the body 10 of the embodiment, the left reinforcement 60 is disposed above the left rear side member 50. The front end of the left rear side member 50 is joined to the outdoor floor crossmember 42. The left reinforcement 60 is joined to the indoor floor crossmember 40 and is also joined to the rear floor panel 20b above the left rear side member 50. In this configuration, the left rear side member 50 is reinforced by the left reinforcement 60. Thus, deformation of the left rear side member 50 is mitigated when a rear-end collision occurs to the vehicle. Further, a rear end of the left rear side member 50 is located above a portion of the rear floor panel 20b that is located frontward of the outdoor floor crossmember 42. Thus, when a rear-end collision occurs to the vehicle, a moment load is applied to the portion of the rear floor panel 20b that is located frontward of the outdoor floor crossmember 42. Since the left reinforcement 60 is joined to the indoor floor crossmember 40 and is also joined to the rear floor panel 20b at a position rearward of the outdoor floor crossmember 42, the moment load applied to the portion of the rear floor panel 20b that is located frontward of the outdoor floor crossmember 42 can be reduced. In particular, since the left reinforcement 60 is joined to the upper surface of the indoor floor crossmember 40 which is located above the rear floor panel 20b, a height difference between a collision point (the rear end of the left rear side member 50) and a support point (the front end of the left reinforcement 60) is small, which efficiently reduces the moment load. The moment load can be reduced also by the right rear side member 52 and the right reinforcement 62, in the same manner.

Further, as shown in FIGS. 6 and 7, in the body 10 of the embodiment, the floor panel 20 is not covered by the battery case 70 in a part of the range 90 (i.e., range surrounded by the indoor floor crossmember 40, the outdoor floor crossmember 42, the left rocker 30, and the right rocker 32). Thus, the lower surface of the floor panel 20 within the range 90 is prone to being exposed to rainwater. As described, however, the floor panel 20 consists of the rear floor panel 20b, which is a single plate, within the range 90. In other words, the floor panel 20 within the range 90 is free from joint sites of panels. Thus, water penetration through a joint site does not occur within the range 90. Consequently, a high water blocking effect can be obtained.

Further, in the body 10 of the embodiment, the rear floor panel 20b extends to the left and right wheel house panels 34, 36, as described. Disposing the rear floor panel 20b, which consists of a single plate, over a wide range as above brings about a higher water blocking effect.

Further, as described with reference to FIG. 5, the rear floor panel 20b extends outward beyond the outer perimeter edge 60w of the left reinforcement 60 in the range where the left reinforcement 60 overlaps the rear floor panel 20b. That is, as shown in FIG. 9, the boundary 66 between the rear floor panel 20b and the left reinforcement 60 is oriented upward (to inside of the cabin). The inwardly oriented boundary 66 can prevent water penetration from below the rear floor panel 20b. This water blocking effect can also be obtained in the right reinforcement 62 by the same structure.

In the body 10 of the embodiment described above, the battery case 70 is located below the floor panel 20. Alternatively, another unit component may be located below the floor panel 20. For example, a fuel tank or a hydrogen tank may be located below the floor panel 20 as the unit component. The fuel tank is used in vehicles of which energy source is fossil fuel (e.g., gasoline vehicles, diesel vehicles, hybrid vehicles, etc.). The hydrogen tank is used in fuel cell vehicles of which energy source is hydrogen.

Some of the technical elements disclosed herein will be listed below. It should be noted that the respective technical elements are independent of one another, and are useful solely or in combinations.

In an aspect of the body disclosed herein, the body may further comprise a rear side member and a reinforcement. The panel (which consists of a single plate) may extend to a position located rearward of the outdoor floor crossmember. The rear side member may protrude downward from the panel, be joined to the outdoor floor crossmember, and extend rearward from the outdoor floor crossmember along a side edge of the panel. The reinforcement may be joined to the indoor floor crossmember, extend from the indoor floor crossmember to a position above the rear side member, and be joined to the floor panel at the position above the rear side member.

According to this configuration, the water blocking effect can be obtained also in a range located rearward of the outdoor floor crossmember.

In an aspect of the body disclosed herein, the reinforcement may be in contact with the panel from above. In a planar view of the panel from above, the panel may extend outward beyond an outer perimeter edge of the reinforcement in a range in which the reinforcement is in contact with the panel.

According to this configuration, a boundary between the reinforcement and the panel is exposed to the inside of cabin, thus water penetration into the vehicle through this boundary can be prevented.

In an aspect of the body disclosed herein, the body may further comprise a wheel house panel located rearward of the outdoor floor crossmember. The panel may be joined to the wheel house panel.

This configuration can bring about the water blocking effect over a larger range.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A body of a vehicle, comprising:
   a floor panel comprising a panel consisting of a single plate;

a pair of rockers extending along both of side edges of the floor panel, respectively;

an indoor floor crossmember protruding upward from the floor panel and connecting the rockers to each other;

an outdoor floor crossmember protruding downward from the floor panel, connecting the rockers to each other, and located rearward of the indoor floor crossmember; and a unit component located below the floor panel, wherein the unit component extends from a position located frontward of the indoor floor crossmember to a position that is located rearward of the indoor floor crossmember and frontward of the outdoor floor crossmember, and a portion of the floor panel that is within a range surrounded by the pair of rockers, the indoor crossmember, and the outdoor crossmember consists of the panel.

2. The body of the claim 1, further comprising:
a rear side member; and
a reinforcement,
wherein the panel extends to a position located rearward of the outdoor floor crossmember, the rear side member protrudes downward from the panel, is joined to the outdoor floor crossmember, and extends rearward from the outdoor floor crossmember along one of the side edges of the panel, and the reinforcement is joined to the indoor floor crossmember, extends from the indoor floor crossmember to a position above the rear side member, and is joined to the floor panel at the position above the rear side member.

3. The body of claim 2, wherein the reinforcement is in contact with the panel from above, and in a planar view of the panel from above, the panel extends outward beyond an outer perimeter edge of the reinforcement in a range in which the reinforcement is in contact with the panel.

4. The body of claim 2, further comprising a wheel house panel located rearward of the outdoor floor crossmember, wherein the panel is joined to the wheel house panel.

* * * * *